United States Patent
Gao et al.

(10) Patent No.: US 12,234,040 B2
(45) Date of Patent: Feb. 25, 2025

(54) MULTI-PURPOSE PLANET ROVER

(71) Applicant: Harbin Institute of Technology, Harbin (CN)

(72) Inventors: Haibo Gao, Harbin (CN); Huaiguang Yang, Harbin (CN); Lan Huang, Harbin (CN); Liang Ding, Harbin (CN); Zhaowei Yu, Harbin (CN); Zongquan Deng, Harbin (CN); Haitao Yu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 588 days.

(21) Appl. No.: 17/629,418

(22) PCT Filed: Jul. 10, 2020

(86) PCT No.: PCT/CN2020/101378
§ 371 (c)(1),
(2) Date: Jan. 24, 2022

(87) PCT Pub. No.: WO2021/031740
PCT Pub. Date: Feb. 25, 2021

(65) Prior Publication Data
US 2022/0289405 A1  Sep. 15, 2022

(30) Foreign Application Priority Data

Aug. 20, 2019 (CN) .......................... 201910767581.4

(51) Int. Cl.
*B64G 1/16* (2006.01)
*B62D 7/04* (2006.01)
*B62D 9/00* (2006.01)

(52) U.S. Cl.
CPC ................ *B64G 1/16* (2013.01); *B62D 7/04* (2013.01); *B62D 9/00* (2013.01)

(58) Field of Classification Search
CPC ............... B62D 7/04; B62D 9/00; B64G 1/16
See application file for complete search history.

(56) References Cited

U.S. PATENT DOCUMENTS 5,431,243 A * 7/1995 Richards ................ B62K 5/027
180/215
11,766,929 B1 * 9/2023 Decuzzi ............. H02K 11/0094
180/216

(Continued)

FOREIGN PATENT DOCUMENTS

CN  109927776 A  *  6/2019
CN  110920751 A  *  3/2020

(Continued)

*Primary Examiner* — Kevin Hurley
(74) *Attorney, Agent, or Firm* — Chun-Ming Shih; LANWAY IPR SERVICES (57) ABSTRACT

A multi-purpose planet planetary exploration rover is provided in this invention, which relates to the field of planet exploration. The multi-purpose planetary exploration rover includes a case body, mounted with a first wheel at left and right sides respectively; and a cantilever, having a front end connected to the case body, a rear end of the cantilever being mounted with a second wheel; wherein the cantilever is rotated or fixed relative to the case body, the second wheel is steered relative to the cantilever, and the first wheel and the second wheel are used to drive the multi-purpose planetary exploration rover. Compared with the prior art, the multi-purpose planetary exploration rover of this invention can effectively explore special geographic locations such as cliffs, volcanic craters, craters and lava caves on alien planets.

14 Claims, 3 Drawing Sheets

(56) References Cited

U.S. PATENT DOCUMENTS

| | | | | |
|---|---|---|---|---|
| 2014/0008138 A1* | 1/2014 | Kim | ........................ | B60L 50/66 |
| | | | | 180/220 |
| 2014/0305728 A1* | 10/2014 | Jezequel | .............. | B62D 61/065 |
| | | | | 180/215 |
| 2016/0096574 A1* | 4/2016 | Liu | ......................... | B62K 5/10 |
| | | | | 180/215 |

FOREIGN PATENT DOCUMENTS

| | | | | | |
|---|---|---|---|---|---|
| CN | 111824260 A | * | 10/2020 | ........... | B62D 11/003 |
| CN | 214325249 U | * | 10/2021 | | |
| JP | 10230864 A | * | 9/1998 | | |
| JP | 2001048069 A | * | 2/2001 | | |

* cited by examiner

MULTI-PURPOSE PLANET ROVER

FIELD OF THE INVENTION

The present invention relates to the field of planet exploration technology, in particular, to a multi-purpose planet rover.

BACKGROUND OF THE INVENTION

Although the planetary rover that has been put into use in the world can drive on soft and rugged terrain, it is large and heavy, which is not convenient for exploring special geographical locations such as cliffs, volcanic craters, craters, and lava caves on foreign planets.

To this end, usually, a small exploration rover is mounted on a large planetary exploration rover (mother rover), and the small exploration rover (child rover) is used to explore the aforementioned special geographic location, i.e., the "mother-child rover" is used for exploration. However, due to the limitation of volume and weight, the volume of small exploration rover should be compressed a lot, so small exploration rovers with two-wheel structure are usually adopted. However, the small exploration rover with two-wheel structure is limited by its own structure. On the one hand, the number of detection devices on board is small, and the aforementioned special geographic location cannot be fully and effectively detected. On the other hand, an additional supporting follower wheel needs to be installed, and the follower wheel will produce huge bulldozing resistance, so that the small exploration rover travels slowly, consumes a lot of power, and is difficult to control, and the actual movement path differs greatly from the planned path.

Therefore, for the large planetary exploration rover and the small planetary exploration rover, how to make the planetary exploration rover not only equipped with sufficient detection equipment, but also can fully limit and reduce its size and weight has become a major problem.

In addition, with the continuous development of planetary exploration, new design concepts have made the structure of the planetary exploration rover become diverse, wherein the most important ones are integral-chassis type planetary exploration rovers and split-chassis type planetary exploration rovers. However, there is currently a lack of effective preliminary verification capabilities.

SUMMARY OF THE INVENTION

The present invention aims to solve the problems that the existing planetary exploration rover cannot effectively explore the special geographical locations such as cliffs, volcanic craters, craters and lava caves on alien planets. In addition, it is unable to effectively detect and verify integral-chassis type planetary exploration rovers and split-chassis type planetary exploration rovers.

In order to solve the above technical problem, a multi-purpose exploration rover is provided in the present invention. The multi-purpose exploration rover includes a case body and a cantilever. The case body is mounted with a first wheel at left and right sides, respectively. The cantilever has a front end connected to the case body, and a rear end of the cantilever is mounted with a second wheel. The cantilever is rotated or fixed relative to the case body, the second wheel is steered relative to the cantilever, and the first wheel and the second wheel are used to drive the multi-purpose planetary exploration rover.

Further, the cantilever is mounted with a first locking mechanism, and the first locking mechanism enables the cantilever to remain fixed relative to the case body. The multi-purpose planetary exploration rover is mounted with a detection device. The detection device includes a plurality of multi-dimensional force sensors, and the plurality of multi-dimensional force sensors are mounted at shafts of the first wheel and the second wheel, respectively.

Further, the two first wheels enable the multi-purpose planetary rover to be steered through differential steering.

Further, the second wheel is connected to the cantilever through a steering mechanism. The steering mechanism includes a horizontal arm, a vertical arm, and a connecting plate. The horizontal arm is connected to the second wheel. The vertical arm has a lower end connected to the horizontal arm, and the vertical arm is located on one side of the second wheel. The connecting plate has one end connected to an upper end of the vertical arm, and the other end of the connecting plate is hingedly connected to the cantilever.

Further, the cantilever is mounted with a second locking mechanism, and the second locking mechanism prevents the second wheel from steering relative to the cantilever.

Further, the second wheel is connected to the cantilever through the steering mechanism, the steering mechanism is mounted with a second drive motor, and the second drive motor is used to drive the second wheel to be steered relative to the cantilever.

Further, the second drive motor is mounted with an encoder, and the encoder is used to detect a steering angle of the second wheel relative to the cantilever.

Further, the second wheel is mounted with a first drive motor, and the first drive motor is used to drive the second wheel to rotate. The multi-purpose planetary exploration rover is mounted with a controller, and the controller is connected to the first locking mechanism, the second locking mechanism, the first drive motor and the second drive motor respectively.

Further, the second wheel drives the cantilever to rotate relative to the case body.

Further, the cantilever has a rectangular plate-shaped structure, and front and rear ends of the cantilever are two ends in a length direction of the cantilever.

Further, the first wheel and the second wheel have cylindrical structures, outer round surfaces of the first wheel and the second wheel are respectively formed with a plurality of convex edges, and the plurality of convex edges are arranged around the outer round surfaces of the first wheel and the second wheel.

Further, the second wheel moves along the cantilever and is held at any position between the front end and the rear end of the cantilever.

Further, the cantilever is mounted with: a rack, fixed to the second wheel, the rack extending along forward and backward directions of the cantilever; a gear, engaged with the rack; and a drive mechanism, connected to the gear.

Further, the cantilever is provided with a rectangular through hole, and the rectangular through hole is arranged parallel to the rack. The rectangular through hole is mounted with a movable base, and the movable base moves back and forth along a length direction of the rectangular through hole. The rack is fixed to the movable base, and the movable base is hingedly mounted with the steering mechanism. The steering mechanism is connected to the second wheel, the movable base is mounted with the second drive motor, and the second drive motor is used to rotate the steering mechanism.

Further, a plurality of plate-shaped members is fixed within the case body, the plurality of plate-shaped members is arranged in parallel with each other, and the two adjacent plate-shaped members are arranged at a distance.

Further, the cantilever is mounted with two bearing portions at the rear end, and the two bearing portions are located on the left and right sides of the cantilever respectively.

The body of the exploration rover in this invention is mainly composed of a case body and a cantilever, and two first wheels and one second wheels are combined to form a triangle-vehicle structure, so that the exploration rover has a very simple body structure. In this way, on the one hand, as a large planetary exploration rover, i.e., the mother exploration rover, since it has only three wheels, at least one drive wheel is reduced as compared to a four- or six-wheel planetary exploration rover, and more load-bearing area is added under the premise of the same frame shape and volume, so that more detection equipment may be carried, especially providing a very good platform for carrying a child-rover with larger volume and weight. On the other hand, as an independent exploration rover, it uses the very simple structure of the body to reduce the volume and weight of the body while carrying effective detection devices, so that effective detection of the "special geographic location" mentioned in the background technology is achieved, and further the cantilever may rotate relative to the case body and the second wheel may rotate relative to the cantilever, so that the case body may be flexibly turned according to the actual terrain of the outer planet, thereby improving the applicability of the rover to various terrains. In a still another aspect, for the small exploration rover, i.e., the child-rover, the simple structure of the body may be utilized to carry more detection devices, so as to effectively detect the "special geographic location" mentioned in the background technology. Two first wheels and one second wheel are used to effectively support the rover body on the ground while utilizing the characteristics of both the first wheel and the second wheel as drive wheels to eliminate the huge bulldozing resistance caused by the wheels on the ground, so that the small rover may drive fast and reduce energy waste, and with the features that the second wheel, the cantilever and the case body may all be turned, the small exploration rover has a very flexible steering ability.

In addition, for the currently-developed integral-chassis type planetary exploration rovers and split-chassis type planetary exploration rovers (the "split-chassis type" involved in this invention is mainly for trailer-type chassis, i.e., the front body is hinged to the rear body, and the front body and the rear body may rotate relative to each other), verification may be performed before exploration, and the rover takes advantage of the feature that the cantilever may be rotated or fixed relative to the case body such that the cantilever and the case body form an integral chassis when fixed. When the cantilever and the case body rotate, the two first wheels and the case body form the front body, while the cantilever and the second wheel form the rear body, and then through installation of corresponding detection devices on the body and through detection and comparison and analysis for the driving state in the two types of body, effective detection and verification may be realized.

In this invention, the body structure of two configurations is formed only by the cantilever selectively remaining fixed or rotated relative to the case body, so that the conversion mode of the two different configurations is very simple.

In this way, the exploration rover of this invention may be used as a large planetary exploration rover or an independent planetary exploration rover or a small planetary exploration rover or a preliminary verification vehicle for planetary exploration, thereby having a wide range of multi-purpose functions.

BRIEF DESCRIPTION OF THE DRAWINGS

Aspects of the present invention are best understood from the following detailed description when read with the accompanying figures. The exemplary embodiments of the present invention and the description thereof are used to explain the present invention, and do not constitute improper limitations on the preset invention. In the drawings.

DESCRIPTION OF THE PREFERRED EMBODIMENTS

In order to enable the above objects, features and advantages of the disclosure to be more apparent and easily understood, the specific embodiments of the disclosure will be further elaborated hereafter in connection with the drawings.

In the description of the present invention, it should be understood that orientations or position relationships indicated by terms "front", "back", and the like are orientations or position relationships shown in the accompanying drawings, and these terms are merely used to facilitate description of the present invention and simplify the description, but not to indicate or imply that the mentioned apparatus or element must have a specific orientation and must be constructed and operated in a specific orientation. Therefore, these terms cannot be understood as a limitation to the present invention.

The terms "first", "second", "third", "fourth", "fifth" are used only for description and shall not be interpreted as an indication or implication of relative importance or an implicit indication of the number of technical features. Thus, features defined with "first", "second" "third", "fourth", "fifth" may include at least one such feature, either explicitly or implicitly.

Figure 1:
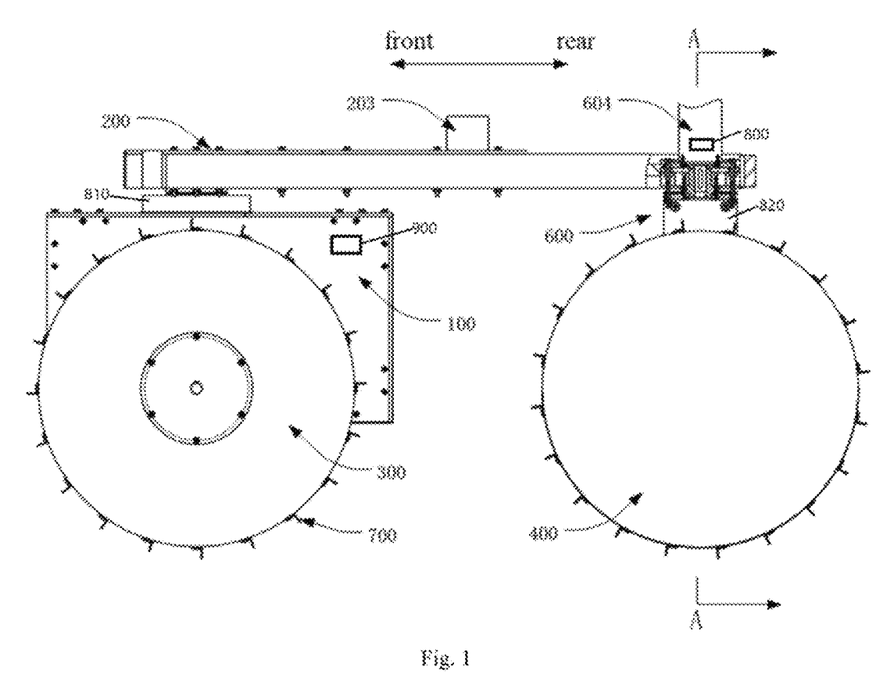
FIG. 1 is a structural front view of a multi-purpose planetary exploration rover in the present invention.
Figure 2:
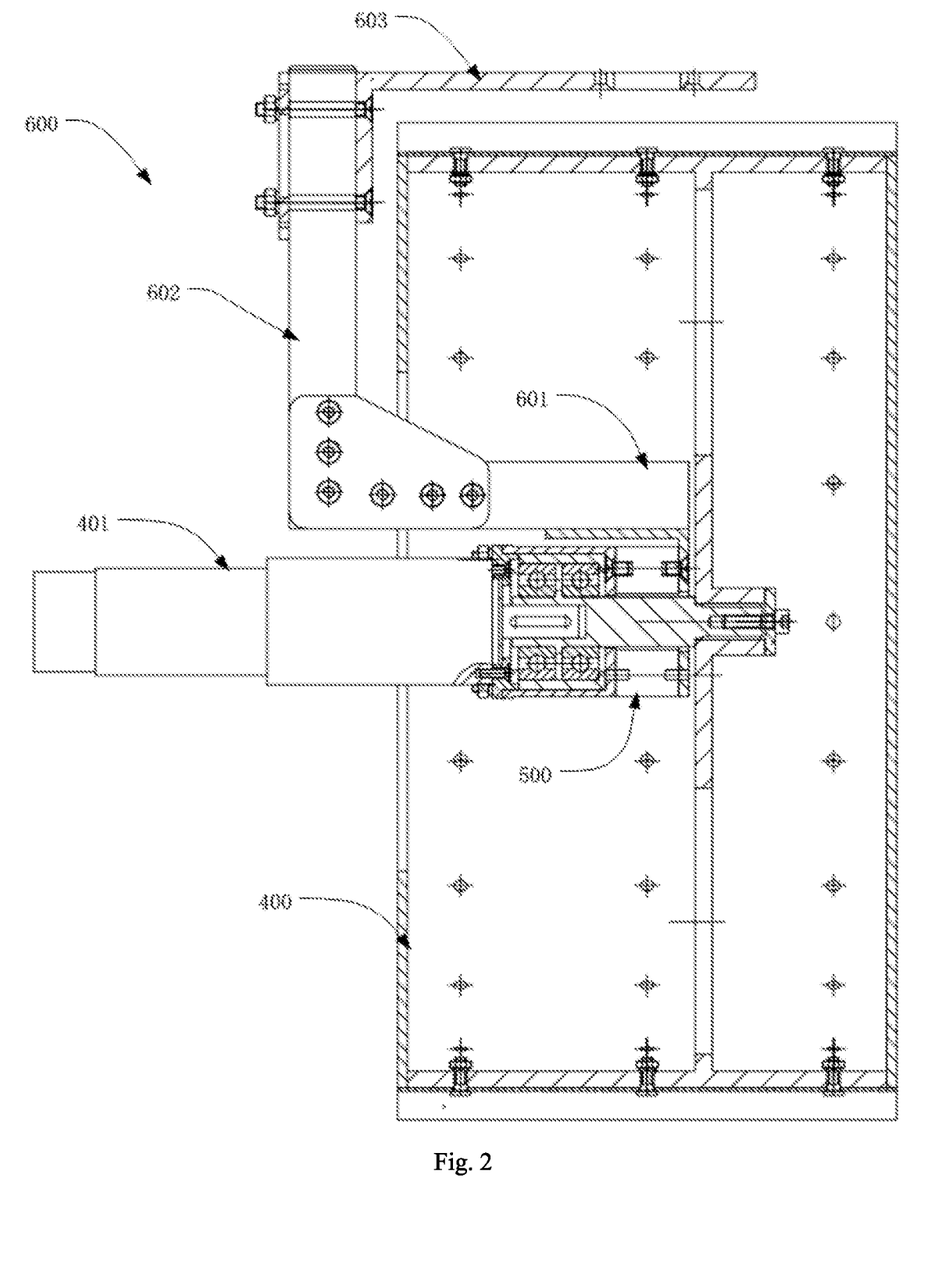
FIG. 2 is a cross-sectional view taken along Line AA of FIG. 1.
Figure 3:
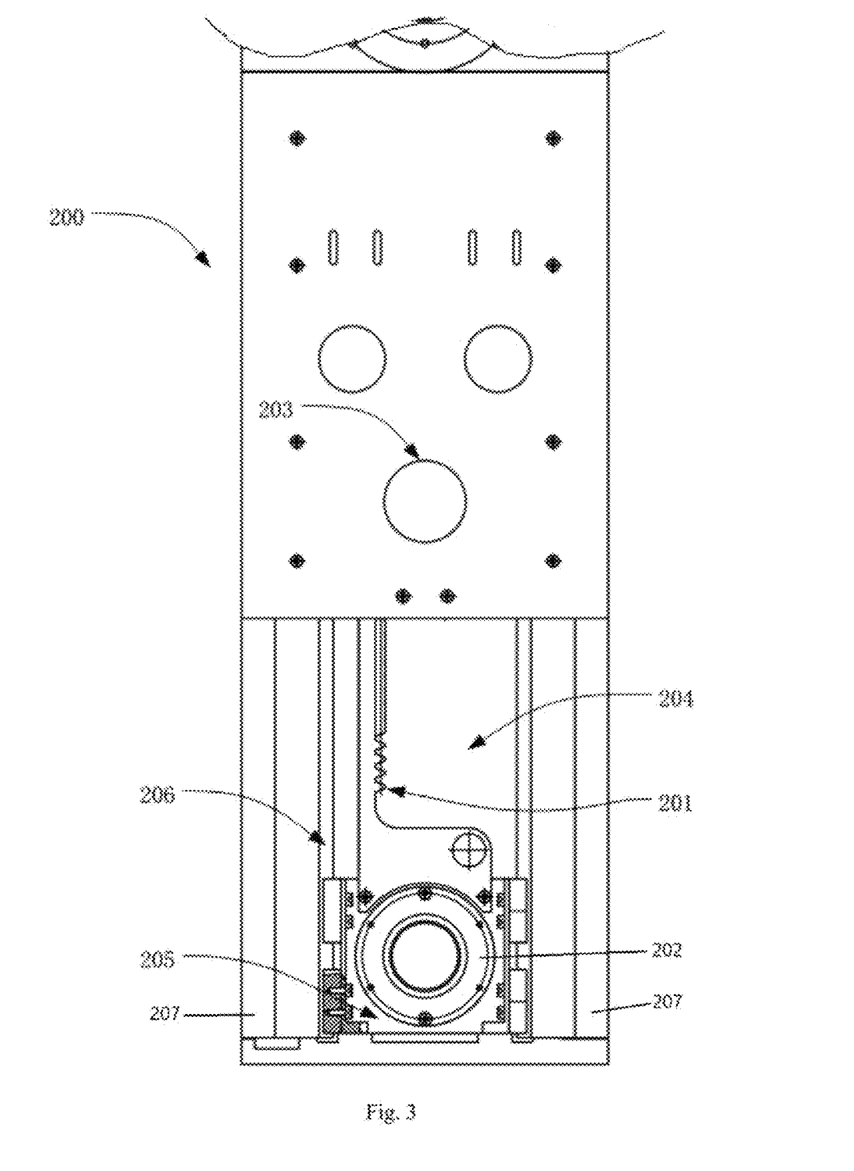
FIG. 3 is a schematic top view of the cantilever in the present invention.

With reference to FIGS. 1 to 3, the present embodiment provides a multi-purpose planetary exploration rover, which includes a case body 100 and a cantilever 200. The case body 100 is mounted with a first wheel 300 at left and right sides respectively. The cantilever 200 has a front end connected to the case body 100, and the cantilever 200 has a rear end mounted with a second wheel 400. The cantilever 200 may be rotated or fixed relative to the case body 100, the second wheel 400 may steer relative to the cantilever 200, and the first wheel 300 and the second wheel 400 are used to drive the multi-purpose planetary exploration rover.

It should be noted that the case body 100 is mounted with a first wheel 300 at left and right sides respectively. Here, the two first wheels 300 may drive the exploration rover to steer, or only the second wheel 400 is used to drive the exploration rover to steer.

Further, the exploration rover in the present embodiment may be considered as a planetary detection robot, which realizes autonomous detection through artificial intelligence.

In addition, the cantilever 200 may be rotated or be fixed relative to the case body 100, which may be specifically realized by the "limiting mechanism" mentioned later, and no further explanation will be given here.

Similarly, the second wheel 400 may be steered relative to the cantilever 200, which may also be specifically realized by the "limiting mechanism" mentioned later, and no further explanation will be given here.

The body of the exploration rover in the present embodiment is mainly composed of a case body 100 and a cantilever 200, and two first wheels 300 and one second wheel 400 are combined to form a triangle-vehicle structure, so that the exploration rover has a very simple body structure. On the one hand, as a large planetary exploration rover, i.e., the mother exploration rover, since it has only three wheels, at least one drive wheel is reduced as compared to a four- or six-wheel planetary exploration rover, and more load-bearing area is added under the premise of the same frame shape and volume, so that more detection equipment may be carried, especially providing a very good platform for carrying a child-rover with larger volume and weight. On the other hand, as an independent exploration rover, it uses the very simple structure of the body to reduce the volume and weight of the body while carrying effective detection devices, so that effective detection of the "special geographic location" mentioned in the background technology is achieved. Further, the cantilever 200 may rotate relative to the case body 100 and the second wheel 400 may rotate relative to the cantilever 200, so that the case body may be flexibly turned according to the actual terrain of the outer planet, thereby improving the applicability of the rover to various terrains. In a still another aspect, for the small exploration rover, i.e., the child-rover, the simple structure of the body may be utilized to carry more detection devices, so as to effectively detect the "special geographic location" mentioned in the background technology. Two first wheels 300 and one second wheel 400 are used to effectively support the rover body on the ground while utilizing the characteristics of both the first wheel 300 and the second wheel 400 as drive wheels to eliminate the huge bulldozing resistance caused by the wheels on the ground, so that the small rover may drive fast and reduce energy waste, and with the features that the second wheel 400, the cantilever 200 and the case body 100 may all be turned, the small exploration rover has a very flexible steering ability.

In addition, for the currently-developed integral-chassis type planetary exploration rovers and split-chassis type planetary exploration rovers (the "split-chassis type" involved in the present embodiment is mainly for trailer-type chassis, i.e., the front body is hinged to the rear body, and the front body and the rear body may rotate relative to each other), verification may be performed before exploration, and the rover takes advantage of the feature that the cantilever 200 may be rotated or fixed relative to the case body 100 such that the cantilever 200 and the case body 100 form an integral chassis when fixed. When the cantilever 200 and the case body 100 rotate, the two first wheels 300 and the case body 100 form the front body, while the cantilever 200 and the second wheel 400 form the rear body, and then through installation of corresponding detection devices on the body and through detection and comparison and analysis for the driving state in the two types of body, effective detection and verification may be realized.

In the present embodiment, the body structure of two configurations is formed only by the cantilever 200 selectively remaining fixed or rotated relative to the case body 100, so that the conversion mode of the two different configurations is very simple.

In this way, the exploration rover of the present embodiment may be used as a large planetary exploration rover or an independent planetary exploration rover or a small planetary exploration rover or a preliminary verification vehicle for planetary exploration, thereby having a wide range of multi-purpose functions.

It should be noted that the above-mentioned "integral" and "split" body has different steering directions. Since the cantilever 200 remains fixed relative to the case body 100 in the "integral body" state, in order to steer the car body, two first wheels 300 are required to steer in a differential manner, and then the second wheel 400 follows the corresponding steering, so that the integral body completes the corresponding steering action. In the "split body" state, the cantilever 200 may be rotated relative to the case body 100, but the second wheel 400 may not be steered relative to the cantilever 200, so that when the car body is steering, the body is steered by the two first wheels 300 to steer, and then the cantilever 200 and the second wheel 400 use the feature of being able to rotate relative to the case body 100 to realize the steering while following the case body 100.

Further, the cantilever 200 is mounted with a first locking mechanism, and the first locking mechanism 200 enables the cantilever to remain fixed relative to the case body 100. The multi-purpose planetary exploration rover is mounted with a detection device.

The detection device includes a plurality of multi-dimensional force sensors 500, and the plurality of multi-dimensional force sensors 500 are mounted at shafts of the first wheel 300 and the second wheel 400 respectively.

Preferably, the six-axis force sensor is used.

It should be noted that the first locking mechanism may include a plurality of screws, and the first locking mechanism is penetrated by the screws and held in the cantilever 200 and the case body 100 simultaneously, so that the cantilever 200 is kept fixed relative to the case body 100. There are various structural forms of the first locking mechanism, which will be explained in detail as much as possible in the following text of the present embodiment, and will not be explained here too much.

As a verification rover, it is necessary to detect, compare and verify the driving conditions of the aforementioned two body structures. Therefore, corresponding detection devices should be mounted, but the inventor of the present embodiment found that the driving state of the rover is mainly obtained by detecting the supporting force of different types of terrain on the body during the driving of the rover. Thus, a plurality of multi-dimensional force sensors 500 are respectively mounted at the shafts of the first wheel 300 and the second wheel 400 to detect the force and moment of the body on different terrains. The conversion of the two body states may be realized by the first locking mechanism locking the cantilever 200 and the case body 100. In this way, the switching between the two body configurations is convenient and fast.

Further, the two first wheels 300 enable the multi-purpose planetary rover to be steered through differential steering.

It should be noted that each of the first wheels 300 may be mounted with a third drive motor, so that the two first wheels 300 may be used as drive wheels independently.

At the same time, when using the differential steering mode for steering, the rotation speed of the two third drive motors is different through control. For example, the third drive motor on the left side rotates, while the third drive motor on the right side does not rotate, so that the case body 100 is steered to one side.

Differential steering makes the mechanical structure simple, and may be only realized by changing the control program while ensuring that each drive wheel has a strong driving function, but the use of mechanical mechanisms in the form of steering will increase the weight and volume of the body. The two third drive motors may provide driving force for each first wheel 300 independently.

Further, the cantilever 200 is mounted with a second locking mechanism, and the second locking mechanism may prevent the second wheel 400 from steering relative to the cantilever 200.

It should be noted that the structural form of the second locking mechanism may be the same as the structural form of the first locking mechanism.

Further, the second wheel 400 is connected to the cantilever 200 through the steering mechanism 600, and the steering mechanism 600 includes a horizontal arm 601, a vertical arm 602 and a connecting plate 603. The horizontal arm 601 is connected to the second wheel 400. The vertical arm 602 has a lower end connected to the horizontal arm 601, the vertical arm 602 being located on one side of the second wheel 400. One end of the connecting plate 603 is connected to an upper end of the vertical arm 602, and the other end of the connecting plate 603 is hingedly connected to the cantilever 200.

The steering mechanism 600 in the present embodiment only consists of the horizontal arm 601, the vertical arm 602 and the connecting plate 603, so that the steering mechanism 600 has a simple structure and a light weight.

Further, the second wheel 400 is connected to the cantilever 200 through the steering mechanism 600, the steering mechanism 600 is mounted with a second drive motor 604, and the second drive motor 604 is used to drive the second wheel 400 to steer relative to the cantilever 200.

Further, the second drive motor 604 is mounted with an encoder, and the encoder is used to detect a steering angle of the second wheel 400 relative to the cantilever 200.

It should be noted that the first drive motor 401 and the third drive motor that will be mentioned later in the present embodiment may also use encoders to learn the rotation angles.

The use of an encoder is more suitable for situations where signal transmission is greatly restricted, and the rotation angle of the drive motor may be obtained through the encoder.

Further, the second wheel 400 is mounted with the first drive motor 401, and the first drive motor 401 is used to drive the second wheel 400 to rotate.

The multi-purpose planetary exploration rover is mounted with a controller, and the controller is connected to the first locking mechanism, the second locking mechanism, the first drive motor 401 and the second drive motor 604 respectively.

Further, the second wheel 400 may drive the cantilever 200 to rotate relative to the case body 100.

The controller is respectively connected with the first locking mechanism, the second locking mechanism, the first drive motor 401 and the second drive motor 604, so that the controller may control the first locking mechanism and the second locking mechanism to perform locking or non-locking actions according to needs while controlling the first drive motor 401 and the second drive motor 604 to perform corresponding actions such as forward rotation, reverse rotation and stop rotation.

In this way, in the narrow space in the aforementioned "special geographic location" or under special circumstances, when the steering space is very limited, the first locking mechanism may be used for stopping work, i.e., unlocking, so that the cantilever 200 may rotate relative to the case body 100, and at the same time the second locking mechanism is also unlocked, so that the second drive motor 604 may drive the second wheel 400 to steer. As such, after the two first wheels 300 drive the case body 100 to steer, the second drive motor 604 drives the second wheel 400 to steer, and then the first drive motor 401 drives the second wheel 400 to rotate, so that the second wheel 400 drives the cantilever 200 to rotate to a designated position, and then the second drive motor 604 drives the second wheel 400 to steer again to adjust a posture of the second wheel 400 relative to the cantilever 200. And during this process, the encoder may be mounted at the first drive motor 401 and the second drive motor 604 to detect the rotation angle.

When the exploration rover leaves the aforementioned special geographic location, the first locking mechanism and the second locking mechanism work to fix the cantilever 200 and the case body 100 respectively, and the cantilever 200 and the second wheel 400 may not be steered.

It should be noted that the first locking mechanism and the second locking mechanism mentioned here are controllable automatic locking mechanisms. The first locking mechanism may include a brake lever, which is mounted on the box body 100, and driven by a rack and pinion assembly 201 in cooperation with a fourth drive motor to move up and down, and the cantilever 200 is provided with a through hole, into which the brake lever may extend when moving up and down, so as to prevent the cantilever 200 from rotating relative to the case body 100. When it is necessary to insert the brake lever into the through hole, the cantilever 200 is rotated to a designated position relative to the case body 100 through the second wheel 400 (a magnetic induction device such as an electromagnetic sensor may be mounted at the through hole and the brake lever to detect whether they are aligned with each other), so that the through hole is aligned with the brake lever, and the brake lever enters the through hole, to realize the fixation of the cantilever 200 relative to the case body 100.

In this way, the controller is connected to the fourth drive motor of the first locking mechanism to realize the locking control of the first locking mechanism.

The controllable automatic locking mode of the second locking mechanism is also the same, and the explanation is omitted here.

Further, the cantilever 200 has a rectangular plate-shaped structure, and front and rear ends of the cantilever 200 are two ends in a length direction of the cantilever. It should be noted that the length direction of the cantilever 200 is the front-rear direction in the figure.

Considering that the surface of the planet detected by the rover is likely to have soft soil, the three-wheeled rover is more unevenly subjected to the lateral force generated by the soft ground on the body than the four- and six-wheeled rover, in particular, the lateral force generated by the soft ground received by the second wheel 400 will be transmitted to the cantilever 200 through the steering mechanism 600 while the lateral force generated by the soft ground received by the two first wheels 300 will also be transmitted to the cantilever 200 through the case body 100, then the front and rear ends of the cantilever 200 bear torsion and torque in different directions, which have a great impact on the performance and service life of the cantilever 200. To this end, in the present embodiment, by utilizing the features that the large-area plate structure with strong tension and high torsion resistance and deformation resistance, the rectangular plate structure is used as the structural form of the cantilever 200, so that the cantilever 200 has strong torsion resistance and deformation resistance.

Further, the first wheel 300 and the second wheel 400 have cylindrical structures, outer round surfaces of the first wheel 300 and the second wheel 400 are respectively formed with a plurality of convex edges 700, and the plurality of convex edges 700 are arranged around the outer round surfaces of the first wheel 300 and the second wheel 400.

In view of the problem of soft soil in the geology of the alien planet, by forming the first wheel 300 and the second wheel 400 as a cylindrical structure, the contact area between the first wheel 300 and the second wheel 400 and the outer planet surface is increased, so as to prevent the wheels from being unable to move after the wheels are stuck in the soft ground on the surface of the alien planet caused by the small size and excess bearing weight from the body for the first wheel 300 and the second wheel 400. At the same time, by adding a plurality of convex edges 700 and surrounding the outer surfaces of the first wheel 300 and the second wheel 400, the convex edges 700 are used to further increase the contact strength of the wheels on the soft ground, and improve the driving efficiency of the wheels on the ground.

Further, the second wheel 400 may move along the cantilever 200 and be held at any position between the front end and the rear end of the cantilever 200.

With this arrangement, the second wheel 400 may move along the cantilever 200 to move the second wheel 400 to a designated position along the cantilever 200 while eliminating the error generated during the rotation of the second wheel 400 in cooperation with the cantilever 200. In addition, the second wheel 400 may move along the cantilever 200 and be held at any position between the front end and the rear end of the cantilever 200, and also the second wheel 400 may be forced to adjust the position according to actual driving situation, so as to better adapt to the steering needs of narrow terrain or complex terrain. For example, when the cantilever 200 rotates and the second wheel 400 rotates while traveling, if there is an obstacle on a predetermined travel track of the second wheel 400, the second wheel 400 may move along the cantilever 200 to make the second wheel 400 avoid the obstacle.

Further, the cantilever 200 is mounted with a rack 201, a gear 202 and a drive mechanism 203. The rack 201 is fixed to the second wheel 400, the rack 201 extending along forward and backward directions of the cantilever 200. The gear is engaged with the rack 201. The drive mechanism 203 is connected to the gear.

The rack 201, the gear, and the drive mechanism 203 realize that the second wheel 400 may move along the cantilever 200 and be held at any position between the front end and the rear end of the cantilever 200.

The drive mechanism 203 may be a fifth drive motor to drive the gear to move relative to the rack 201.

Moreover, the second drive motor 604 is connected to a movable base 205 through a motor fixing structure, and the motor fixing structure is mainly made of alloy steel. The steering mechanism 600 is connected to the movable base 205 through a steering fixed structure, the steering fixed structure is mainly made of alloy steel, and the movable base 205 is a base body made of alloy steel.

With the high comprehensive mechanical properties of alloy steel, such as high strength and strong resistance to deformation, the problem of asymmetric lateral force on both sides of the second wheel 400 caused by the soft soil on the outer planet surface is solved.

Further, the cantilever 200 is provided with a rectangular through hole 204, and the rectangular through hole 204 is arranged parallel to the rack 201. The rectangular through hole 204 is mounted with a movable base 205, and the movable base 205 may move back and forth along a length direction of the rectangular through hole 204. The rack 201 is fixed to the movable base 205, and the movable base 205 is hingedly mounted with the steering mechanism 600. The steering mechanism 600 is connected to the second wheel 400, the movable base 205 is mounted with the second drive motor 604, and the second drive motor 604 is used to rotate the steering mechanism 600. It should be noted that a length direction of the rectangular through hole 204 is the front and back direction in the figure. Rails 206 are respectively formed on both sides of the rectangular through hole 204 in the length direction, the rail 206 extends along the length of the rectangular through hole 204, slots are formed on the left and right sides of the moving base 205 respectively, and the rails 206 are held in the slots.

The provision of the rectangular through hole 204 plays a role of limiting the position of the movable base 205 on the one hand, and on the other hand, the rectangular through hole 204 also reduces the weight of the cantilever 200.

Further, the case body 100 is fixed inside with a plurality of plate-shaped members, the plurality of plate-shaped members are arranged in parallel with each other, and the two adjacent plate-shaped members are arranged at a distance The space in the case body 100 is divided into a plurality of layers of space by the plate-shaped member, and different components are placed in different layer spaces, so that the space utilization rate in the case body 100 and the layout of the inner space are more reasonable.

Further, the cantilever 200 is mounted with two bearing portions at the rear end, and the two bearing portions are located on the left and right sides of the cantilever 200 respectively.

For large planetary exploration rovers and independent planetary exploration rovers, a large amount of bearing space is required, while the three-wheel structure of the rover can make full use of the space at the rear end of the cantilever 200, and the rear end of the cantilever 200 only has the second wheel 400, so that except for the second wheel 400, a large amount of usable space may be formed, thereby fully meeting the bearing needs of large-scale planetary exploration rovers and independent planetary exploration rovers.

Although the present invention is disclosed as described above, the protection scope of the disclosure is not limited to this. Those skilled in the art can make various changes and modifications without departing from the spirit and scope of the present invention, and these changes and modifications will fall within the protection scope of the present invention.

What is claimed is:

1. A multi-purpose planetary exploration rover, comprising:
   a case body, mounted with a first wheel at left and right sides respectively; and
   a cantilever, having a front end connected to the case body, a rear end of the cantilever being mounted with a second wheel;
   wherein the cantilever is rotated or fixed relative to the case body, the second wheel is steered relative to the cantilever, and the first wheel and the second wheel are used to drive the multi-purpose planetary exploration rover;
   the cantilever is mounted with a first locking mechanism, and the first locking mechanism enables the cantilever to remain fixed relative to the case body;
   the multi-purpose planetary exploration rover is mounted with a detection device;

the detection device comprises a plurality of multi-dimensional force sensors, and the plurality of multi-dimensional force sensors are mounted at shafts of the first wheel and the second wheel respectively.

2. The multi-purpose planetary exploration rover according to claim 1, wherein the two first wheels enable the multi-purpose planetary rover to be steered through differential steering.

3. The multi-purpose planetary exploration rover according to claim 1, wherein the second wheel is connected to the cantilever through a steering mechanism, and the steering mechanism comprises:
   a horizontal arm, connected to the second wheel;
   a vertical arm, having a lower end connected to the horizontal arm, the vertical arm being located on one side of the second wheel; and
   a connecting plate, having one end connected to an upper end of the vertical arm, the other end of the connecting plate being hingedly connected to the cantilever.

4. The multi-purpose planetary exploration rover according to claim 1, wherein the cantilever is mounted with a second locking mechanism, and the second locking mechanism prevents the second wheel from steering relative to the cantilever.

5. The multi-purpose planetary exploration rover according to claim 4, wherein the second wheel is connected to the cantilever through the steering mechanism, the steering mechanism is mounted with a second drive motor, and the second drive motor is used to drive the second wheel to be steered relative to the cantilever.

6. The multi-purpose planetary exploration rover according to claim 5, wherein the second drive motor is mounted with an encoder, and the encoder is used to detect a steering angle of the second wheel relative to the cantilever.

7. The multi-purpose planetary exploration rover according to claim 5, wherein:
   the second wheel is mounted with a first drive motor, and the first drive motor is used to drive the second wheel to rotate; and
   the multi-purpose planetary exploration rover is mounted with a controller, and the controller is connected to the first locking mechanism, the second locking mechanism, the first drive motor and the second drive motor respectively.

8. The multi-purpose planetary exploration rover according to claim 7, wherein the second wheel drives the cantilever to rotate relative to the case body.

9. The multi-purpose planetary exploration rover according to claim 1, wherein the cantilever has a rectangular plate-shaped structure, and front and rear ends of the cantilever are two ends in a length direction of the cantilever.

10. The multi-purpose planetary exploration rover according to claim 1, wherein the first wheel and the second wheel have cylindrical structures, outer round surfaces of the first wheel and the second wheel are respectively formed with a plurality of convex edges, and the plurality of convex edges are arranged around the outer round surfaces of the first wheel and the second wheel.

11. The multi-purpose planetary exploration rover according to claim 1, wherein the second wheel moves along the cantilever and is held at any position between the front end and the rear end of the cantilever.

12. The multi-purpose planetary exploration rover according to claim 11, wherein the cantilever is mounted with:
   a rack, fixed to the second wheel, the rack extending along forward and backward directions of the cantilever;
   a gear, engaged with the rack; and
   a drive mechanism, connected to the gear.

13. The multi-purpose planetary exploration rover according to claim 12, wherein the cantilever is provided with a rectangular through hole, and the rectangular through hole is arranged parallel to the rack; the rectangular through hole is mounted with a movable base, and the movable base moves back and forth along a length direction of the rectangular through hole; the rack is fixed to the movable base, and the movable base is hingedly mounted with the steering mechanism; the steering mechanism is connected to the second wheel, the movable base is mounted with the second drive motor, and the second drive motor is used to rotate the steering mechanism.

14. The multi-purpose planetary exploration rover according to claim 1, wherein the cantilever is mounted with two bearing portions at the rear end, and the two bearing portions are located on the left and right sides of the cantilever respectively.

* * * * *